COLOR TELEVISION SYNCHRONIZING

Filed Sept. 26, 1952

INVENTORS
HARRY KIHN
AND JACOB OLSEN
BY [signature]
ATTORNEY

United States Patent Office 2,829,193

Patented Apr. 1, 1958

2,829,193

COLOR TELEVISION SYNCHRONIZING

Harry Kihn, Lawrenceville, and Jacob Olsen, Hightstown, N. J., assignors to Radio Corporation of America, a corporation of Delaware Application September 26, 1952, Serial No. 311,755

11 Claims. (Cl. 178—5.4)

Figure 1:
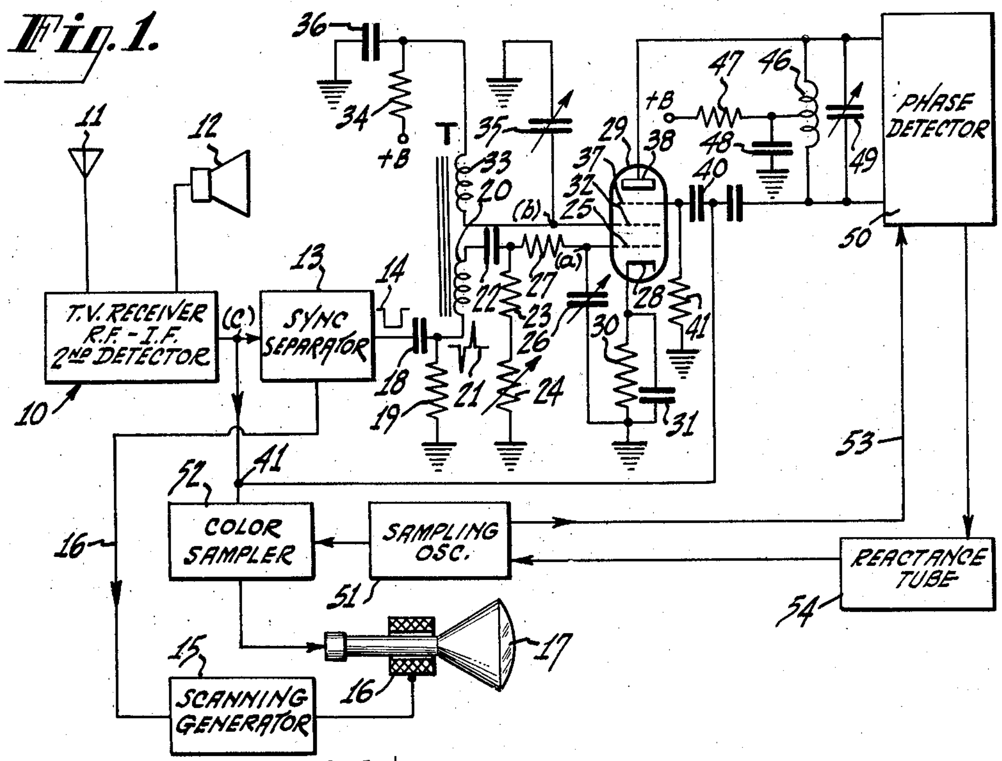

The present invention relates to new and useful improvements in circuitry applicable to the synchronization of television receivers with signals sent out from a television transmitter.

More particularly, the present invention is applicable to color television receivers used in a system of the phase and amplitude modulated sub-carrier wave type such as that described in an article entitled "Recent developments in color synchronization in the RCA color television system," published in February 1950 by the Radio Corporation of America.

In one proposed color television system based upon the signal multiplex principle, which is termed the "phase and amplitude modulated sub-carrier wave" type, the video signal components representative of the brightness detail are transmitted in substantially the manner employed in the transmission of black and white television signals. In such a system, however, the color information is employed to modulate a sub-carrier wave having a carrier frequency which lies within the frequency passband of the video signals carrying the brightness information. This sub-carrier wave is phase modulated in accordance with the particular component color being scanned while the same sub-carrier is amplitude modulated in accordance with the chroma of the color being scanned. In such a system, a description of which may be found in the November 1949 issue of "Electronics" beginning at page 122, it is essential that there be scanning synchronism between the transmitter and the receiver.

As set forth in great detail in the first article cited above, present arrangements provide a "burst" frequency signal which is sent out by the transmitter on the "back porch" of the horizontal blanking pulse, the "burst" being spaced slightly from the horizontal sync pulse. These "bursts" are employed in the receiver to maintain the local sampling oscillator in proper phase relationship with respect to the transmitter. It is, therefore, extremely important that the "burst," which may have a frequency of 3.89 megacycles, be properly removed from the balance of the composite signal which includes the sync pulses and video information. The bursts may be then fed into a phase detector circuit for correcting the phase of the oscillations of the local sampling oscillator.

Generally speaking, the separation of the "bursts" from the composite received signal has heretofore employed various "gating" means. For the most part, the circuits of the prior art have employed rather complex multivibrator circuits which, while effective, necessitate a plurality of tubes and their associated circuits for operation.

It is, therefore, a primary object of the present invention to provide means for separating the "bursts" from a composite received signal.

Another object of the present invention is the provision of means for "burst" separation, which means does not require the employment of multivibrator circuits.

In general, the present invention contemplates the employment of a blocking oscillator as a means for enabling an electronic tube to conduct only during the period of a "burst." In one form of the invention, the blocking oscillator comprises the cathode, control grid and screen grid of a pentode, while the "burst" together with vestigal portions of the composite received signal is applied to the suppressor grid of the pentode, so that, by the use of various delay means, the sync pulses may be employed to cause the tube to conduct only during the periods of the "bursts."

Another object of the present invention, therefore, is that of providing delay means in the input of a gate circuit for delaying the conduction of the gate tube a predetermined amount in time with respect to the original time occurrence of the synchronizing pulse.

A further object of the present invention is that of providing means including a single electronic tube which serves as both a burst separating means and burst amplifying means, which tube acts as its own gating means.

Since, as in the case of the "burst" used in color television systems, it is often necessary to control the width of a "gate," the present invention has as still another object that of providing means for controlling the width of the enabling pulse produced by a blocking oscillator used as a gating means.

It is still another object of the present invention to provide means for controlling the period of occurrence of a gating circuit so that the gating pulse may occur at exactly the proper intervals with respect to the high frequency bursts which are to be passed.

Figure 2:
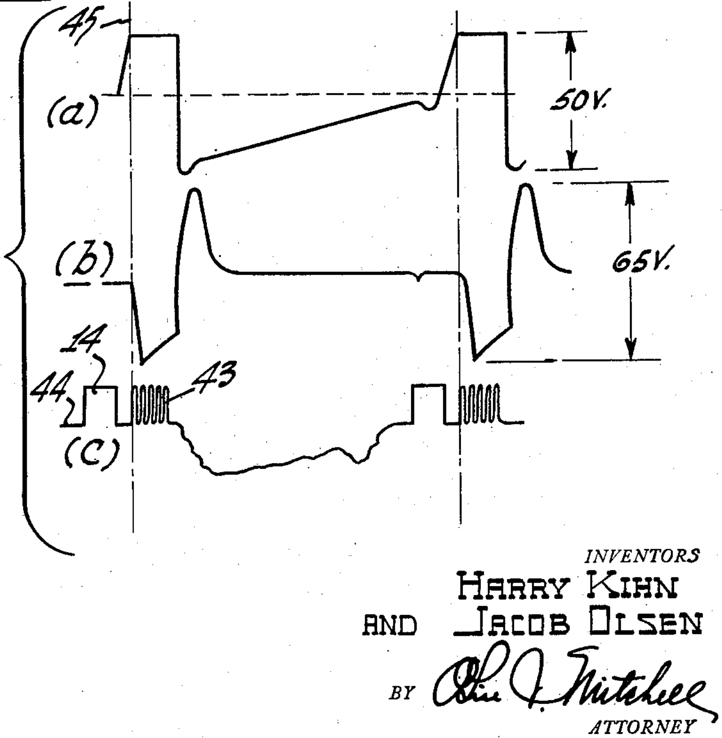

Additional objects and advantages of the present invention, including simplicity, reliability in operation and low production cost will become apparent from a study of the following detailed description of the attached drawings in which:

Fig. 1 illustrates, in block diagram and schematically a color television receiver embodying a form of the present invention; and Fig. 2 illustrates a series of wave forms to which reference will be made during the description of the invention.

Referring to the drawings and particularly to Fig. 1 thereof, reference numeral 10 indicates generally a color television receiver comprising the R. F., I. F. and second detector stages which act upon a composite signal coupled to the receiver from antenna 11. In a manner well known in the art, the audio portion of the signal is detected and amplified prior to application to a loud speaker 12.

The detected or demodulated composite signal which is in the form of the wave illustrated in Fig. 2*c* is then acted upon by the sync separator, indicated generally by reference character 13, which may be of any conventional type. The horizontal sync pulse 14 removed by the sync separator from the balance of the signal is applied to the scanning generator 15 through a coupling 16, in a well-known manner, the function of the scanning generator being that of passing a sawtooth current wave through the deflection coils 16 which serve to deflect the electron beam (or beams) of the kinescope 17. The kinescope may be of the three gun tricolor type of the variety described in an article entitled, "General description of receivers for dot-sequential color TV system which employ direct view tricolor kinescopes," RCA Review, June 1950. Since the television receiver in general is not a part of the present invention, its arrangement is shown diagrammatically by the various blocks, but a description of a suitable color television receiver with which the present invention may be employed is to be found in the Radio Corporation of America publication of April 1950, "General description of receivers for the RCA color television system which employ the RCA direct view tricolor kinescopes."

The sync pulses 14 are also coupled by means of capacitor 18 and resistor 19 to the transformer winding 20. Capacitor 18 and resistor 19, however, constitute a differentiating circuit, as will be understood by persons skilled in the art, which circuit produces the differentiated wave form 21. Wave form 21 is applied to the tuned circuit comprising transformer winding 20, capacitor 22 (which may be 500 micromicrofarads in value) and resistors 23 and 24 (which may be 68 kilohms and 50 kilohms, respectively), the resistor 24 being variable. It should be noted at this point that the circuit comprising elements 20, 22, 23 and 24 determines the period of occurrence of the gate pulse which is produced thereby and which is shown by wave form (*a*) of Fig. 2. This, of course, is affected by the variation of the time constant of the R-C circuit which determines the rate at which the blocking oscillator's grid 25 may return to a conducting level. This aspect of the operation of the invention will be apparent to persons skilled in the art from the further description of the circuit which follows.

The wave form of Fig. 2*a*, which has a frequency equal to that of the horizontal scanning frequency, namely, 15,750 C. P. S., may be delayed as desired by means of the variable capacitor 26 acting in conjunction with resistor 27. The values of these two elements may be, for example, 5 to 50 micromicrofarads and 13 kilohms, respectively.

The cathode 28 of pentode 29 is self-biased by means of resistor 30 shunted by capacitor 31, resistor 30 being connected to ground. Screen grid 32 of tube 29 serves as an anode, insofar as the function of tube 29 as a blocking oscillator is concerned. That is to say, screen grid 32 is connected to a source of B+ voltage through winding 33 of the transformer T and the resistor 34 which may, for example, have a value of 100 *k*. A variable capacitor 35 connects screen grid 32 to ground, the capacitor having a maximum value of, for example, 200 micromicrofarads and serving as a "width" control as will appear more fully hereinafter. Capacitor 36 acts as a high frequency bypass to ground, in a conventional manner.

By virtue of the coupling between windings 20 and 33 of the transformer T, the wave form of Fig. 2*b* is applied to the screen grid 32 of pentode 29. As persons familiar with blocking oscillators will appreciate, such tubes are so arranged that the voltage on the grid or control electrode (corresponding to grid 25 herein) is normally of the order of 5 volts while the turns ratio of the transformer is ordinarily such that the anode voltage (which would correspond here to electrode 32) may be of the order of 50 to 100 volts. Such coupling as is used in conventional blocking oscillators, however, has been found to result in a somewhat weak operation of the burst-separating circuit of the present invention, by reason of the fact that the conventional high-gain coupling of a blocking oscillator grid and anode would produce to negative a pulse on the screen grid 32. Hence, it has been found preferable to select a turns ratio between winding 20 and 33 which may be of the order of three to one, for example. By means of such a coupling the voltage wave form on electrode 25 may be of the value of 50 volts (as indicated in Fig. 2*a*) while that of screen grid 32 may be only 65 volts, as indicated in Fig. 2*b*. This stepped up screen-grid to control-grid arrangement permits the passage of a greater number of electrons through the suppressor grid 37 to the anode 38 of pentode 29.

It will be understood, therefore, that the invention as thus far described operates in such manner that pentode 29 is permitted to conduct only during the positive portions of the wave form of Fig. 2*a* which is applied to its control grid 28 and that, therefore, cathode 28, grid 25 and electrode 32 serve as a "gate" or "enabling" means in the nature of an electronic switch.

The composite detected signal of Fig. 2*c* is also taken off the output of the receiver 10 and coupled through capacitor 40 and resistor 41 to the suppressor grid 37. If desired, a tuned circuit (not shown) favoring the "burst" frequency which may be, as stated above by way of example, 3.89 megacycles may be inserted between point 41 at the output of the receiver 10 and the R-C coupling 41, 40 to amplify the burst frequency while simultaneously attenuating the other portions of the signal including the sync pulses and image signals.

As shown by the wave forms of Fig. 2, the horizontal sync pulse 14 is spaced slightly in front of the burst 43 on the horizontal blanking pedestal 44 of the wave form, as will be understood by those skilled in the art. By virtue of the differentiation of the sync pulse 14 to the form indicated at 21, the conduction of pentode 29 is delayed so that it would thereby commence at the end or the trailing edge of the sync pulse. The delaying action of capacitor 26 and resistor 27, however, permits a slight additional adjustment of the time of conduction of the tube so that the tube may be made to conduct at a point just prior to the commencement of the burst 43. Numeral 45 indicates a reference time point which, it will be noted, passes through the leading edge of wave form (*a*) of Fig. 2 and a point immediately preceding the commencement of the burst. In terms of conduction of the tube, therefore, it will be noted that the delayed pulse of Fig. 2*a* permits the tube to conduct from a time immeditaely preceding the burst to a time just after the end of that burst. Thus, the blocking oscillator serves as a gate for the burst which, as stated, is applied to suppressor grid 37 of the pentode. A general description of the operation of conventional blocking oscillator may be found in the textbook on Wave Forms, published in 1949 by the McGraw-Hill Book Company, Inc., which was written by personnel of the Massachusetts Institute of Technology Radiation Laboratories (chapt. 6).

Anode 38 of the pentode is connected to a source of B+ voltage through inductance 46 and resistor 47, which may be a one kilohm resistor. A four micromicrofarad capacitor 48 acts as a high frequency bypass to ground. The output circuit of pentode 29 includes the resonant circuit comprising inductance 46 and capacitor 49, which are tuned to the "burst" frequency.

The burst frequency voltage appearing across this tuned circuit is fed into a phase detector represented by the block 50 which may be of any conventional type as described in the above-cited articles. A sampling oscillator 51 which produces a 3.89 megacycle oscillation for comparison with the incoming signal in the color sampler 52 is connected to the phase detector as indicated schematically by the connection 53. Thus, the phase and frequency of the sampling oscillator 51 are matched with the synchronizing bursts in the phase detector 50 in the usual manner for controlling reactance tube 54 which, in turn, controls the phase and frequency of oscillation of the sampling oscillator 51.

As explained in the above-mentioned article entitled "Recent developments in color synchronization in the RCA color television system," dealing with color synchronization, the sampling oscillator is thereby kept in phase with the transmitter so that the color sampler 52 may compare the phase of the subcarrier of the video signal with the reference phase for producing a determination of the hue of the signal at any given instant. The output of the color sampler is fed to the control elements (not shown) of the kinescope 17 in a known fashion.

In the operation of the circuit, the sync separator 13 supplies the horizontal sync pulse 14 to the differentiating circuit 18, 19 which produces the pulses 21 for application to the turned circuit in the grid of the pentode. Through the delaying action of capacitor 26 and resistor 27, the voltage wave form of Fig. 2*a*, is applied to electrode 25. It will be remembered that the repetition rate of the wave form applied to control electrode 25 is set by capacitor 22 and resistors 23 and 24. By virtue of the coupling of transformer T, the wave form of Fig. 2*b* appears on screen grid 32. The width of this latter wave form is controlled by capacitor 35. Capacitor 35 actually determines the resonant frequency of the circuit including winding 33 of the transformer and, as persons skilled in the art will appreciate, the width of the pulse of wave form 2b depends upon the natural frequency of oscillation of the tuned circuit in question. The positive portion of wave form 2a causes tube 29 to conduct and, at the moment of conduction, the burst portion 43 of wave form 2c is applied to the suppressor grid 37. Since the width of the positive pulse of wave form 2a is at least as great as the duration of the burst, the tube will continue to conduct during the burst interval, so that the amplified burst will appear in the tuned output circuit 46, 49. In the manner of a conventional blocking oscillator, the grid 25 of pentode 29 will be driven far beyond cutoff by the negative swing of wave form 2a and, through proper selection of the time constant in this grid circuit, the tube will be maintained in a non-conducting state until the occurrence of the next positive input pulse which, of course, is designed to coincide with the succeeding "burst."

Persons skilled in the art will, therefore, appreciate the fact that pentode 29 of the present invention serves the dual function of a gating circuit, which hitherto has been performed by one or more multivibrators, and also serves to amplify the synchronizing burst for application to the phase detector.

Further advantageous aspects of the present invention will become apparent from a study of the foregoing circuit analysis and additional modifications within the scope of the appended claims will also suggest themselves.

Having thus described our invention, what we claim as new and desire to secure by Letters Patent is:

1. In a circuit adapted to receive a composite signal including sync pulses and bursts of high frequency voltage of predetermined duration occurring thereafter, means for separating said bursts from said composite signal which comprises a normally non-conductive electronic tube having first, second and third electrodes, means for coupling pulses corresponding to said sync pulses to said first electrode for causing said tube to conduct in response to the trailing edge of said sync pulse, means coupling said second electrode to said first electrode for causing said tube to operate as a blocking oscillator, and means for coupling a voltage corresponding to said composite signal to said third electrode.

2. A circuit for separating a burst of high frequency voltage from a composite signal including said burst and a sync pulse occurring prior thereto which comprises: an electronic tube, means connecting said tube to operate as a blocking oscillator, said tube having an electrode and an anode and means for coupling a voltage waveform corresponding to said sync pulse to said electrode to cause said tube to conduct for discrete intervals in phase with the occurrence of said bursts, a circuit for utilizing said bursts, and coupling means for applying bursts from the anode of said tube to said utilizing circuit.

3. A receiver circuit for separating a burst of high frequency voltage from a composite signal including said burst and a sync pulse occurring prior thereto which comprises: a normally non-conductive electronic tube having a first electrode, a second electrode and a third electrode; means in circuit with said first electrode for delaying and coupling thereto a voltage produced from said sync pulse; means for inductively coupling said first electrode circuit to said second electrode to produce oscillations in said tube; means for blocking said oscillations periodically; and means for applying to said third electrode a waveform corresponding to said composite signal, whereby said electronic tube is caused to conduct only during intervals in which said bursts occur.

4. A receiver circuit for amplifying periodic bursts of high frequency voltage which comprises an electron tube, means connecting said tube to operate as a blocking oscillator, said tube having a signal electrode; a source of voltage bursts; means coupled to said oscillator for causing it to conduct only during repetitive intervals corresponding to said periodic bursts; and means for applying voltage bursts from said source to said oscillator during said oscillator's period of conduction.

5. Electronic switch means for separating a burst of high frequency voltage from a composite signal, said switch means including an electronic tube blocking oscillator, which is normally non-conductive and which comprises a cathode, first and second electrodes, and an auxiliary electrode, and an anode; a source of signal voltage; means for coupling said source to said auxiliary electrode; and means for inductively coupling said second electrode to said first electrode such that the A. C. component of the voltage on said second electrode is a minimum value with respect to the A. C. voltage on said first electrode consistent with maintenance of oscillation, whereby to increase the output of said tube at its anode.

6. Electronic switch means for separating periodically recurring voltage waves from a composite signal, said switch means comprising an electronic tube having a cathode, first, second and third electrodes, and an anode; transformer means coupling said first and second electrodes in such manner that said cathode and first and second electrodes operate as a blocking oscillator to produce periodic oscillations; means in circuit with said first electrode for coupling thereto voltage pulses in phase with said periodically occurring voltage waves for rendering said tube conductive; means for applying to said third electrode an input waveform corresponding to said periodically recurring voltage wave; and means for deriving from said anode a voltage output corresponding to said input wave.

7. In a color television receiver adapted to distinguish colors denoted by received signals by comparing the phase of said signals with a reference, said receiver being adapted to receive a composite signal including image signals, sync pulses and periodic bursts of high frequency voltage having a predetermined phase and spaced from said sync pulses, apparatus for separating said bursts from the balance of said composite signal, which comprises: a normally non-conducting electronic tube comprising first, second and third electrodes; means for delaying and coupling said sync pulses to said first electrode in such manner as to render said tube conductive during the occurrence of such bursts; means coupling said second electrode to said first electrode to apply energy from said second electrode to said first electrode; and means for applying a voltage corresponding to said composite signal to said third electrode, whereby said tube passes substantially only said bursts.

8. A receiver as set forth in claim 7 wherein said first and second electrodes are operatively connected to so as to comprise a blocking oscillator.

9. A receiver as defined by claim 7 including a time constant resistor-condenser combination in circuit with said first electrode for determining the period of repetition of said tube's conduction.

10. A receiver as defined by claim 7 including means for varying the duration of the conduction of said tube.

11. A receiver as defined by claim 10 wherein said last-named means comprises capacitive means in circuit with said second electrode.

References Cited in the file of this patent

UNITED STATES PATENTS

| | | |
|---|---|---|
| 2,378,746 | Beers | June 19, 1945 |
| 2,428,946 | Somers | Oct. 14, 1947 |
| 2,539,440 | Labin | Jan. 30, 1951 |
| 2,546,972 | Chatterjea | Mar. 3, 1951 |
| 2,594,380 | Barton | Apr. 29, 1952 |
| 2,644,032 | Maker | June 30, 1953 |
| 2,653,187 | Luck | Sept. 22, 1953 |
| 2,714,132 | Fredendall | July 26, 1955 |

OTHER REFERENCES

Introduction to Color Television, Admiral Corp., Chicago, Illinois, pages 17 to 27.